United States Patent [19]

Nagashima

[11] Patent Number: 4,741,556
[45] Date of Patent: May 3, 1988

[54] SEAT BELT RETRACTOR

[75] Inventor: Hideyuki Nagashima, Yokohama, Japan

[73] Assignee: Nissan Motor Co., Ltd., Japan

[21] Appl. No.: 863,727

[22] Filed: May 16, 1986

[30] Foreign Application Priority Data

May 22, 1985 [JP] Japan .................. 60-108366

[51] Int. Cl.$^4$ .................................. B60R 21/10
[52] U.S. Cl. ..................... 280/807; 242/107.6
[58] Field of Search ............ 280/801, 806, 807; 242/107.6, 107.7

[56] References Cited

U.S. PATENT DOCUMENTS

| | | | |
|---|---|---|---|
| 4,384,735 | 5/1983 | Maeda et al. | 280/807 |
| 4,478,433 | 10/1984 | Taguchi et al. | 280/807 |
| 4,489,804 | 12/1984 | Kamijo | 280/807 |
| 4,534,441 | 8/1985 | Kamijo et al. | 180/268 |

FOREIGN PATENT DOCUMENTS

52-9891  3/1977  Japan .
77941    5/1984  Japan .................. 280/807

Primary Examiner—John J. Love
Assistant Examiner—Ross Weaver
Attorney, Agent, or Firm—Leydig, Voit & Mayer

[57] ABSTRACT

In a seat belt retractor including a housing, a take-up shaft rotatably mounted in the housing, a spring for biasing the take-up shaft in a belt retracting direction, a gear mechanism operatively connected to the belt take-up shaft, a tensionless mechanism operatively connected to the gear mechanism and selectively operable to prevent the spring from rotating the take-up shaft in the belt retracting direction, and a motor actuated slack control mechanism operatively connected to the gear mechanism and operable to rotate the belt take-up shaft, there is provided a control unit comprising a computer which suppresses an automatic belt slack feeding operation when the vehicle speed is at or above a predetermined value, for example, 60 km/h.

18 Claims, 6 Drawing Sheets

SEAT BELT RETRACTOR

BACKGROUND OF THE INVENTION

1. Field of the Invention

The present invention relates in general to a seat belt retractor, and more particularly to a seat belt retractor with an electronically controlled tensionless mechanism.

2. Description of a Prior Art

Japanese Patent Application Second Provisional Publication No. 52-9891 shows a conventional seat belt retractor with a tensionless mechanism. In the known retractor, an electric motor is operated just after a seat occupant has worn a seat belt so as to rotate a belt take-up shaft in a belt feeding direction by a predetermined amount of slack. This known retractor, however, has a drawback that since the predetermined amount of slack is provided to the seat belt irrespective of the amount of an original slack which is held when the seat occupant has worn the belt, the resultant amount of slack may exceed an allowable amount if the original slack is large. This may obstruct the effective operation of the seat belt upon collision of a vehicle. Another drawback encountered in the known seat belt retractor is that since once the tensionless condition is established, the belt take-up shaft is locked and prevented from rotating in the belt feeding direction, the belt can not be pulled out of the retractor further, thus restraining the seat occupant from changing his or her sitting posture.

SUMMARY OF THE INVENTION

Is is therefore an essential object of the present invention to provide a seat belt retractor with an electronically controlled tensionless mechanism, which is free of the above-mentioned drawbacks.

According to the present invention, there is provided a seat belt retractor in which a comparison is made between an actually drawn belt length L and the desired slack-provided belt length LO at the time when the vehicle speed is at or above a predetermined value to detect a difference therebetween, and if the difference is within a predetermined range, operation of an electric motor for moving the seat belt is suppressed. With this, meaningless operation of the motor can be avoided.

According to the present invention, there is provided a seat belt retractor which comprises a housing; a take-up shaft rotatably mounted to the housing; biasing or spring means for biasing the take-up shaft in a belt retracting direction to retract a seat belt; a gear mechanism operatively connected to the belt take-up shaft; a tensionless mechanism operatively connected to the gear mechanism and selectively operable to prevent the spring means from rotating the take-up shaft in the belt retracting direction; a motor actuated slack control mechanism operatively connected to the gear mechanism and selectively operable independent of the spring means to rotate the belt take-up shaft; to retract or to feed the belt to a given length first means for controlling operation of the tensionless mechanism and the motor actuated slack control mechanism in a first given manner; second means for controlling operation of the tensionless mechanism and the motor actuated slack control mechanism in a second given manner; and third means for selectively operating the first and second means in response to the application of instruction signals thereto.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
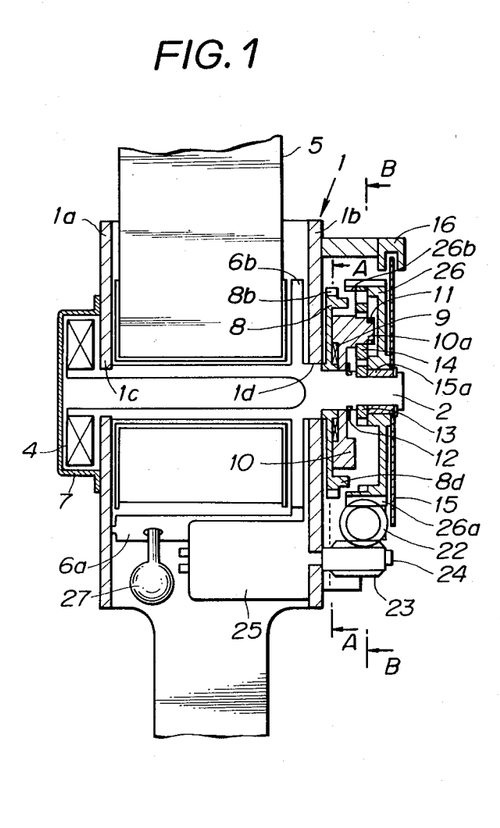
FIG. 1 is a diagrammatic cross sectional view taken along the line C—C of FIG. 2, showing a seat belt retractor according to the present invention.
Figure 2:
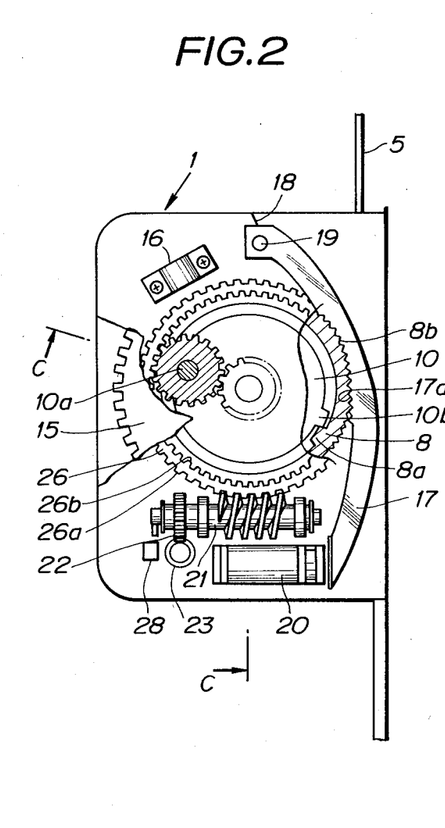
FIG. 2 is a side elevational view partly section taken along the line A—A and the line B—B of FIG. 1.

Referring to FIGS. 1 and 2 of the drawings, there is shown a seat belt retractor according to the present invention, which comprises a housing 1 including two parallel side walls 1a and 1b. A belt take-up shaft 2 spans across the side walls 1a and 1b with its axially opposed end portions rotatably received in aligned apertures 1c and 1d formed in the side walls 1a and 1b. The take-up shaft 2 is biased by a return spring 4 in a belt retracting direction, that is, in a clockwise direction as viewed in FIG. 2. The spring 4 is in the form of a spiral spring having an outer end hooked to a spring cover 7 mounted to the side wall 1a and an inner end anchored to the take-up shaft 2. The seat belt retractor further comprises a ratchet wheel 6b integral with the take-up shaft 2, a lever 6a formed with a pawl 6c adapted to engage with the ratchet wheel 6b and a weight 27 which constitute a known emergency locking mechanism.

One axial end portion of the take-up shaft 2 is projected outward from the side wall 1b, which is reduced in diameter, as shown in FIG. 1. The reduced end portion of the take-up shaft 2 is connected to a gear mechanism and for this purpose carries thereon a first gear 8 which is rotatable relative to the shaft 2. The first gear 8 is formed with external teeth 8b and further has an annular wall section 8d formed with an inwardly extending projection 8a as is best seen from FIG. 2. Disposed within the annular wall section 8d is a carrier wheel 10 which is rotatably disposed on the end portion of the take-up shaft 2 and held by a snap ring 12. As is seen from FIG. 2, the carrier wheel 10 is formed with an outwardly extending projection 10b adapted to abut with the projection 8a of the first gear 8. The carrier wheel 10 is biased by a spiral spring 9 in a clockwise direction as viewed in FIG. 2 thereby to maintain the engagement between the projections 10b ad 8a. As is seen from FIG. 1, the spiral spring 9 is arranged between the first gear 8 and the carrier wheel 10 and acts as a limited rotation coupling in that it limits the relative rotation allowed therebetween.

The carrier wheel 10 is provided with a pin 10a on which a planetary gear 14 is rotatably disposed. A snap ring 11 is fixed to the pin to hold the planetary gear 14.

The planetary gear 14 meshes with a sun gear 13 which is coaxially fixed to the belt take-up shaft 2.

The axial end of the take-up shaft 2 is provided with a slit wheel 15 coaxially secured thereto through a connecting boss 15a. As is seen from FIG. 1, at the inboard side of the slit wheel 15, there is a second gear 26 which is rotatably disposed on the boss 15a. The second gear 26 has an annular wall section which is formed with both external teeth 26a and internal teeth 26b. The internal teeth 26b mesh with the afore-mentioned planetary gear 14.

Thus, the sun gear 13, the planetary gear 14 and the second gear 26 constitute a planetary gearing arrangement which is carried by the carrier wheel 10.

In carrying out the invention, a motor actuated slack control mechanism is provided including an electric motor 25 connected to the housing 1 of the retractor and having a driving shaft 24 on which a first worm 23 is securely mounted. The first worm 23 meshes with a first worm wheel 22 coaxially and securely mounted on a second worm 21 which meshes with the external teeth 26a of the second gear 26.

Referring to FIG. 2, a tensionless mechanism, connected to the gear mechanism, is herein shown as including a stopper lever 17 pivotally connected at its one end to the side wall 1b through a pivot pin 19. The stopper lever 17 is formed with teeth 17a which is adapted to lockably engage with the external teeth 8b of the first gear 8. The stopper lever 17 is biased by a spring 18 toward a disengaged position, that is, in a counterclockwise direction as viewed in FIG. 2. The stopper lever 17 has a free end adapted to be attracted by a solenoid 20, that is, an electromagnet, when the latter is energized. Thus the solenoid and spring act as a selective engagement means and, upon energization of the solenoid 20, the stopper lever 17 is pivoted against the spring 18 in a direction to engage the external teeth 8b of the first gear 8 thereby to lock the same.

For the purpose of detecting a rotation angle of the belt take-up shaft 2, there is provided a known first angle sensor which comprises the slit wheel 15 and a slit counter 16. Measuring the number of slits of the slit wheel 15, the counter 16 outputs a signal representative of the rotation angle of the take-up shaft 2. As will become apparent as the description proceeds, the first angle sensor can also serve as a detecting means which detects the position in length of a seat belt 5 put on the seat occupant. For the same purpose, a second-known angle sensor 28 is provided, which is designed to detect the angle of rotation of the take-up shaft 2 induced by operation of the electric motor. 20. These detectors 16 and 28 are described in U.S. Pat. No. 4,534,441 granted on Aug. 13, 1985 (Nissan Motor Co., Ltd.).

Figure 3:
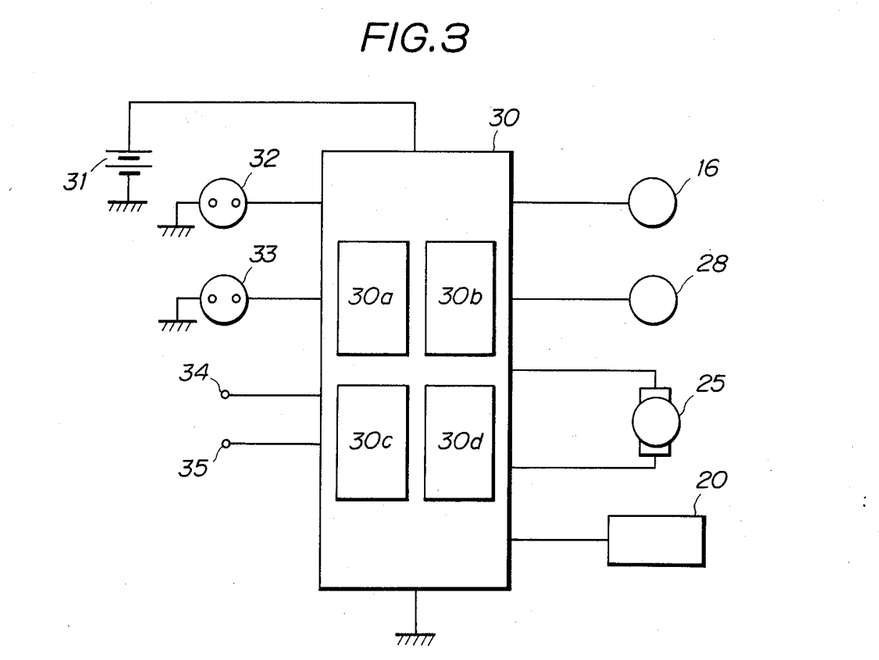
FIG. 3 is a block diagram of a control unit of the seat belt retractor of the invention.

The electric motor 25 and the solenoid 20 are actuated under the control of a control unit 30 as shown in FIG. 3. The control unit 30 comprises a microcompute including, as usual, a CPU, an I/O interface, a RAM, a ROM and a timer. The ROM stores a program depicted by the flowcharts shown in FIGS. 4A and 4B.

Referring to FIG. 3, the reference numeral 31 denotes a battery as a source for operating the control unit 30 which includes generally a first means 30a, a judging means, 30b, a second means 30c and a restricting means 30d these means comprising the control unit 30 operating under control of program sections stored in the ROM.

Based on the output from a vehicle speed sensor 34, the first means 30a controls the motor activated slack control mechanism and the tensionless mechanism to operate in a first given manner and, for this purpose, actuates the motor 25 and the solenoid 20 so as to provide the seat belt, which has been pulled out to assume a reference length measured in terms of rotation angle of the take-up shaft 2, with a desirable slack in accordance with the vehicle speed. Based on the output from the vehichle speed sensor 34, the judging means 30b makes a determination as to whether the vehicle speed is at a predetermined value or not and selectively operates the first and second means. Based on the output from the vehicle speed sensor 34 the second means 30c controls the motor actuated slack control mechanism and the tensionless mechanism to operate in a second given manner and, for this purpose, actuates the solenoid 20 so as to cause the seat belt to assume its tensionless and slackless state. When the vehicle speed is at the predetermined value the restricting means 30d compares the tensionless and slackless position of the belt measured in terms of rotation angle of the take-up shaft with the afore-mentioned reference position to detect a difference therebetween, and suppresses output from the first means 30a when the difference is within a predetermined range.

The control unit 30 receives information signals from the first and second angle sensors 16 and 28, a buckle switch 32, a seat switch 33, the vehicle speed sensor 34 and a low G sensor 35. The buckle switch 32 is turned ON when the tongue and the buckle of the belt are coupled. The seat switch 33 is turned OFF when a seat sliding mechnism of the associated seat is under operation. The seat switch of this type is known from U.S. Pat. No. 4,384,735. The vehicle speed sensor 34 is known from Page V-20 of Service Periodical No. 491 issued by Nissan Motor Co., Ltd. Briefly describing the vehicle speed sensor 34, it converts the rotation of a speed meter cable to a train of pulses. The low G-sensor 35 detects a negative acceleration of the vehicle and is shown in U.S. Pat. No. 4,534,441.

Instruction signals from the control unit 30 are fed to the electric motor 25 and the solenoid 20 in order to operate the motor actuated slack control mechanism and the tensionless mechanism selectively in the aforementioned first and second operating manners.

In the following, the operation of the seat belt retractor will be described by use of the flowcharts shown in FIGS. 4A and 4B and with the aid of FIGS. 5 to 8.

For ease of description, operation will begin with respect to a condition wherein the seat belt 5 is fully retracted by the take-up shaft 2 under the work of the return spring 4.

Figure 4A:
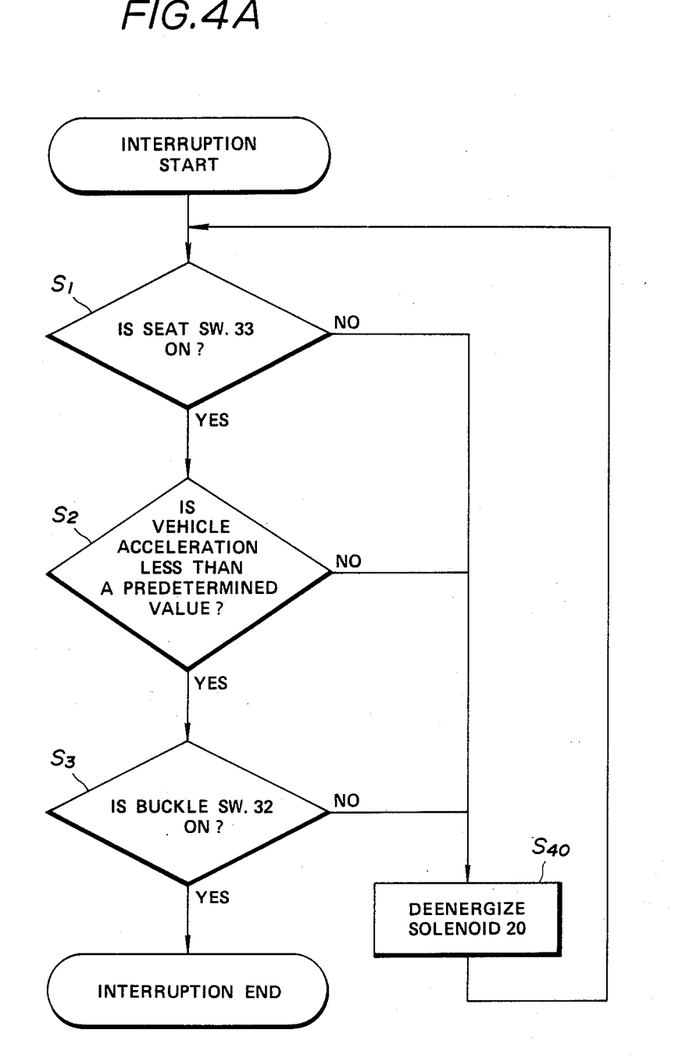
FIGS. 4A and 4B are flowcharts illustrating the operation carried out by the control unit.
Figure 5:
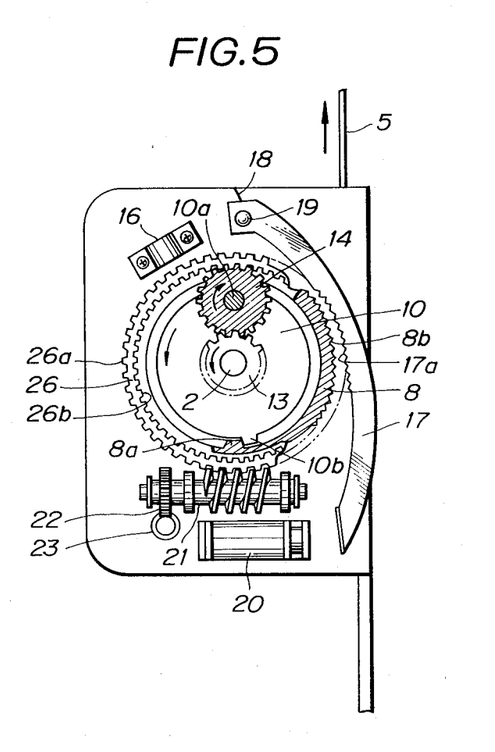
FIGS. 5 through 8, each being a sectional view taken along the line A—A of FIG. 1, show various modes of operation of the seat belt retractor.
Figure 6:
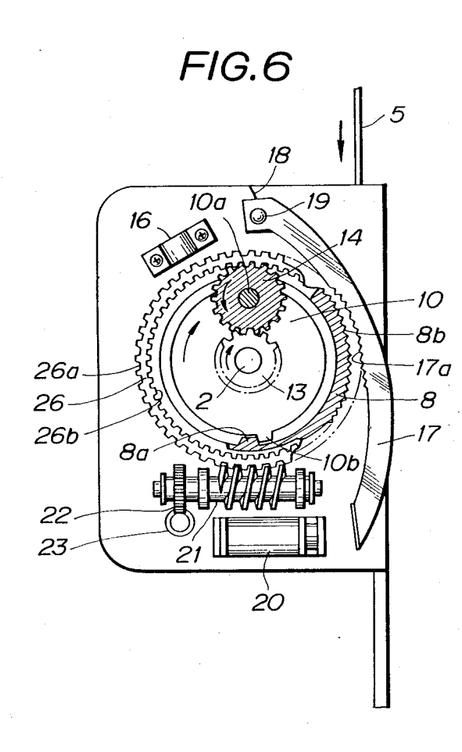

(1) When a passenger is seated, an interruption routine starts along the flowchart shown in FIG. 4A. While the seat occupant is selecting his or her appropriate seat position by manipulating the seat sliding mechanism, the seat switch 33 if kept OFF. Thus, the answer to the question in a step $S_1$ is NO, so that the program proceeds to the step $S_{40}$ whereby the first means 30a issues a "solenoid OFF" signal. Thus, the solenoid 20 is not energized leaving the stopper lever 17 disengaged from the first gear 8 under the action of the spring 18. When the seat adjustment is completed, the seat switch 33 is turned ON and the program proceeds from step $S_1$ to a step $S_2$ where a determination is made by checking the output from the low G sensor 35 whether the vehicle acceleration is less than a predetermined value or not. Since the vehicle is at standstill, the answer is YES, so that the program proceeds to a step $S_3$ where a determination is made whether the buckle switch 32 is ON or not. Since the buckle switch 32 is OFF before the seat occupant wears the belt 5, the program proceeds to the step $S_{40}$ maintaining deenergization of the solenoid 20. Thus, the stopper lever 17 remains in the disengaged position. Under this condition, the belt take-up shaft 2 can rotate in both directions, i.e., in the belt retracting direction under the action of the return spring 4 and in the belt feeding direction against the action of the spring 4. This is because, under this condition, the first gear 8, the carrier wheel 10, the planetary gear 14, the sun gear 13 and the take-up shaft 2 can rotate or orbit in both directions irrespective of the fixed state of the second gear 26 meshed with the second worm 21. More specifically, even when the second gear 26 is fixed, the rotation of the sun gear 13 secured to the take-up shaft 2 can cause the planetary gear 14 to travel along the internal teeth 26b of the second gear 26 rotating the carrier plate 10 and thus the first gear 8 (which is connected to the carrier plate 10 through the spiral spring 9) about the axis of the take-up shaft 2. Thus, the seat belt 5 can be pulled out of the seat belt retractor as shown in FIG. 5. As is seen from this drawing, when the seat belt 5 is pulled, the take-up shaft 2 and the sun gear 13 are rotated counterclockwise, that is, in the belt feeding direction, causing the planetary gear 14 to rotate clockwise about the pin 10a and orbit counterclockwise, thus causing the carrier wheel 10 and thus the first gear 8 to rotate counterclockwise. It will be thus understood that the rotation of the take-up shaft 2 in the belt feeding direction is allowed because the orbiting movement of the planetary gear 14 is not restrained although the rotation of the second gear 26 is prevented.

Figure 4B:
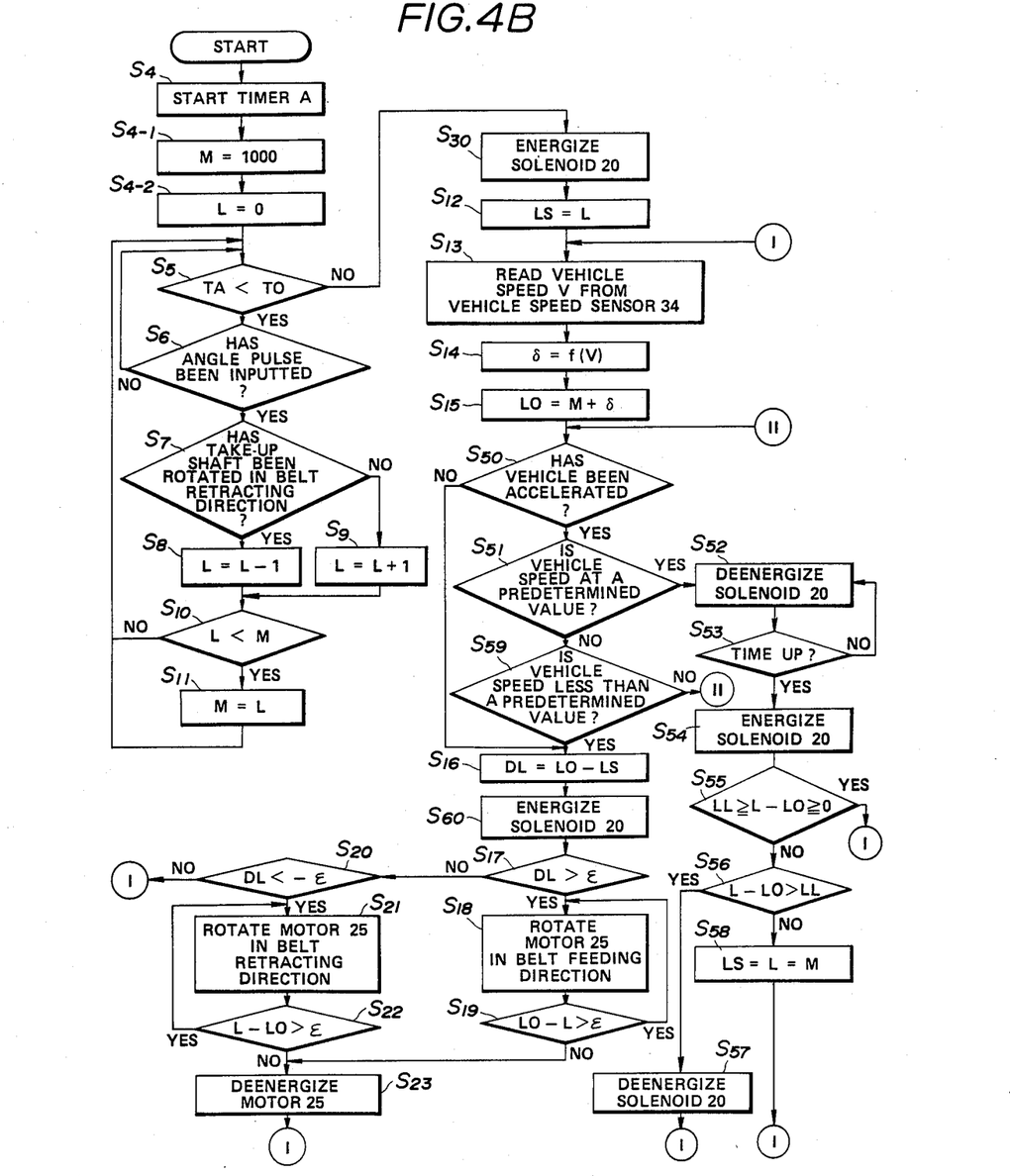

(2) When the seat belt 5 is drawn out by a certain amount for putting the seat belt 5 around the seat occupant and the tongue of the seat belt 5 is coupled with the buckle, the buckle switch 32 is turned ON causing the start of a main routine according to the flowchart shown in FIG. 4B. Upon this, the program proceeds to a step $S_4$ where a timer A is started. A predetermined period of time TO, such as around 10 seconds, is set in the timer A. This period of time is empirically determined on the recognition that the seat occupant will finish arranging his or her posture within this period of time after coupling the tongue with the buckle. After execution of step $S_4$, the program proceeds to steps $S_{4-1}$ and $S_{4-2}$. In step $S_{4-1}$ a minimally drawn belt length M (which will be refered to as the reference belt length M) is represented in terms of an angle of rotation of the take-up shaft 2, which angle is assigned a value of 1000. In step $S_{4-2}$ an actually drawn belt length L is similarly assigned a value of zero. After setting M and L, the program proceeds to a step $S_5$ where the elapsed time TA after the coupling of the tongue with the buckle is checked to determine if it is less than TO (i.e., 10 seconds). If the time value TA is less than TO, the program proceeds from step $S_5$ to a step $S_6$ where a determination is made whether or not the angle pulses have been input from the angular position sensor 16. If the answer to the question in step $S_6$ is NO, the program returns to step $S_5$, but, if the answer is YES, the program proceeds to a step $S_7$ where a determination is made based on the pulses from the angular position sensor 16 whether or not the take-up shaft 2 has been rotated in the belt retracting direction, i.e., in the clockwise direction as viewed in FIG. 6. If the answer to the question in the step $S_7$ is YES, the program proceeds to a step $S_8$ where L is decreased by one, while, if the answer is NO, the program proceeds to a step $S_9$ where L is increased by one. After execution of the step $S_8$ or $S_9$, a step $S_{10}$ is executed where a determination is made whether L is less than M or not. If L is less than M, the program proceeds to the step $S_{11}$ where M is assigned the value of L and the program returns to the step $S_5$.

Under this condition, the solenoid 20 is not yet energized, so that the stopper lever 17 remains in the disengaged position. Thus, as mentioned hereinabove, the belt take-up shaft 2 can rotate under the action of the return spring 4 in the belt retracting direction, that is, clockwise as viewed in FIG. 6 so as to retract the belt 5, thus removing slack, if any. Since the second gear 26 is fixed, the clockwise rotation of the take-up shaft 2 together with the sun gear 13 causes the first gear 8 and the carrier wheel 10 to rotate in the same direction and the planetary gear 14 to rotate in the reversed direction, i.e., counterclockwise. As a result, a slackness (but tensioned) state is imposed on the belt within the predetermined period of time TO (10 seconds) after the seat occupant has coupled the tongue with the buckle. A description of the relief of tension provided by spring 4 follows.

When the timer value TA has exceeded the predetermined period of time TO, that is, when it is recognized that the seat occupant has finished arranging his or her posture, the program proceeds from step $S_5$ to a step $S_{30}$ where electric current is applied to the solenoid 20 thereby energizing the same. Upon this, the stopper lever 17 is attracted by the solenoid 20 against the spring 18 and is thus brought into locking engagement with the external teeth 8b of the first gear 8 thereby locking the same. The locking of the first gear 8 prevents further rotation of the carrier wheel 10 in, coincident with the belt retracting direction of the belt take-up shaft 2, by the engagement of the outward projection 10b of the carrier wheel 10 with the locked inward projection 8a of first gear 8. Preventing the clockwise rotation of the carrier wheel 10 means that the belt take-up shaft 2 can not rotate anymore in the belt retracting direction, i.e., clockwise as viewed in FIG. 7 because of the fixed state of the first gear 8 and the second gear 26. More particularly, under this condition, the belt take-up shaft 2 is permitted to rotate only in the belt feeding direction, i.e., counterclockwise as viewed in FIG. 7, because only the counterclockwise rotation of the carrier wheel 10 is permitted, the carrier wheel 10 and the belt take-up shaft 2 being directly geared and constrained by the gear train established therebetween to a directly gear rotational relationship wherein the rotation of one results in the rotation of the other in only one possible direction. Here the carrier wheel and take-up shaft are constrained in a directly gear rotational relationship to rotate in the same direction. Thus, by virtue of the microcomputer operating under control of the program stored in the ROM and imposing the aforementioned second manner of operation, a tensionless and slackness state is established in the belt retractor.

(3) Automatic provision of an appropriate belt slack according to the aforementioned first manner of operation after establishment of the tensionless and slackness state is carried out next.

Figure 9:
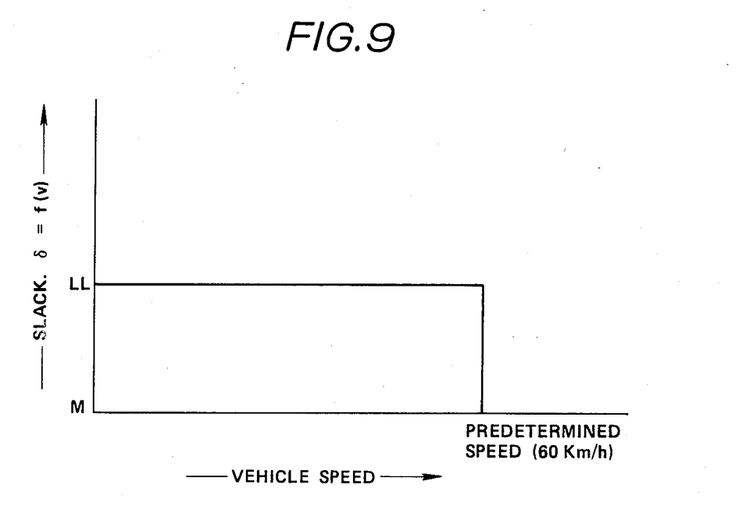
FIG. 9 is a graph showing an appropriate amount of slack of the seat belt with respect to a vehicle speed.

Referring back to flowchart of FIG. 4B, after executing step $S_{30}$, a step $S_{12}$ is executed where the value of the angle of rotation L, representing the actually drawn belt length at the time when the solenoid 20 is energized, is stored as LS, hereinafter referred to as the sample actual belt length. The program proceeds to a step $S_{13}$ where vehicle speed V is read from the vehicle speed sensor 34 and to a step $S_{14}$ when an appropriate belt slack δ is arithmetically determined by an equation δ=f(V). In this step, as is seen from the graph of FIG. 9, the appropriate slack δ, represented by a rotational angle of the take-up shaft 2, is set equal to LL when the vehicle speed is less than a predetermined value, for example, less than 60 km/h. While, when the vehicle speed exceeds the set equal value, the slack δ is determined to zero (0) in order to increase the stability of the seat belt 5 under medium and high speed conditions of the vehicle. Then, the program proceeds from the step $S_{14}$ to step $S_{15}$ where the appropriate slack δ is added to the reference belt length M to provide a desired slack-provided belt length LO The program proceeds to a step $S_{50}$ where a determination is made whether the vehicle is accelerating or not. Since usually the vehicle is under acceleration just after the start thereof, the program proceeds from step $S_{50}$ to a step $S_{51}$ where a determination is made whether the vehicle speed is at a predetermined value or not, i.e., 60 Km/h, for example. This value is empirically determined on the recognition that just after the start of the vehicle, the posture of the seat occupant is not necessarily stable because he or she may handle a cigarette lighter, a radio, a stereo or the like, but by the time the vehicle runs at a speed of around 60 km/h, the posture of the seat occupant becomes stable. That is, the reference belt length M is rechecked upon the seat occupant assuming a stable posture as will latest be described. Just after start of the vehicle, the answer to the question in step $S_{51}$ is NO, thus the program proceeds to a step $S_{59}$ where an indirect determination is made based on the work of the restricting means 30d whether the vehicle speed is less than the predetermined value or not. Due to the same reason, and answer to the question in the step $S_{59}$ is YES, and thus the program proceeds to a step $S_{16}$ where the sample actual belt length LS is subtracted from the desired slack-provided belt length LO, both measured in terms of rotation angle of the take-up shaft 2, to detect a difference DL. Then, based on the output from the first output means 30a, a step $S_{60}$ is executed for energizing of the solenoid 20. Since the solenoid 20 has been kept energized, the program proceeds to a step $S_{17}$ where a determination is made whether the difference DL is greater than a small value ε, i.e., whether length LS is much smaller and therefore tighter than the desired length LO, where the small value ε is set so as to prvent the occurrence of hunting operation. If the difference DL is greater than the small value ε, the program proceeds to a step $S_{18}$ where based on an output from the first output means 30a, the electric motor 25 is energized to rotate the belt take-up shaft 2 in the belt feeding direction. Then a step $S_{19}$ is executed where a determination is made whether a difference (LO−L) between LO, the desired slack provided belt length, and L, the actual belt length, is greater than the small value ε or not. If the difference (LO−L) is greater than the value ε, the program returns to the step $S_{18}$ to further rotate the take-up shaft 2 in the belt feeding direction. If the difference (LO−L) becomes equal to or less than the small value ε, the program proceeds from step $S_{19}$ to a step $S_{23}$ where the motor 25 is stopped thus causing the stop of the belt feeding rotation of the take-up shaft 2. Thereafter, the program returns to step $S_{13}$.

If, in step $S_{17}$, the answer is NO, the program proceeds to a step $S_{20}$ where a determination is made whether the difference DL is less than −ε or not, i.e., whether the sample actual belt length LS is much larger than, or too loose, as compared to the desired slack-provided belt length LO. If the answer is NO, the program returns to the step $S_{13}$. That is, the electric motor 25 remains deenergized because the difference DL is equal to the limit of an allowable range. However, if the answer to the question in the step $S_{20}$ is YES, the program proceeds to a step $S_{21}$ where the electric motor 25 is energized to rotate the take-up shaft 2 in the belt retracting direction. Then the program procceds to a step $S_{22}$ where a determination is made whether a difference (L−LO) from L to LO is greater than the small value ε or not. If the difference (L−LO) is greater than the small value ε, the program returns to the step $S_{21}$ to cause further rotation of the belt take-up shaft 2 in the belt retracting direction. If the difference (L−LO) becomes equal to or less than the small value ε, the program proceeds from step $S_{22}$ to step $S_{23}$ where, based on the output from the first output means 30a, the electric motor 25 is stopped thereby to cause the stop of the belt retracting rotation of the take-up shaft 2. Then, the program returns to the step $S_{13}$.

Figure 7:
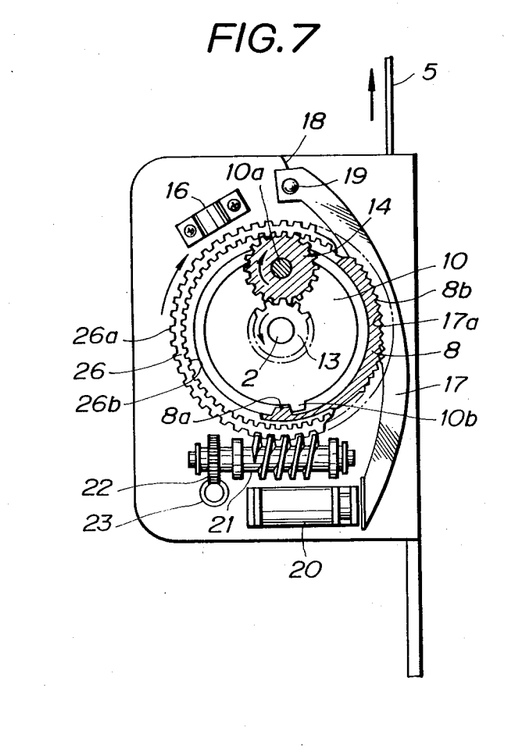

At step $S_{18}$, the seat belt retractor operates in a manner as shown in FIG. 7, that is, the retractor operates to feed the seat belt 15 therefrom. Energizing the motor 25 rotates, by means of the second worm 21, the second gear 26 in a clockwise direction. Under this condition, the carrier wheel 10 is prevented from rotating in the same direction as the second gear 26 because of engagement of the outward projection 10b of the carrier wheel 10 with the inward projection 8a of the first gear 8 which is kept locked by the locking lever 17, so that the planetary gear 14 is forced to rotate clockwise about the pin 10a without making the orbital movement about the sun gear 13. The clockwise rotation of the planetary gear 14 rotates the sun gear 13 and thus the belt take-up shaft 2 in the counterclockwise direction, i.e., in the belt feeding direction. Thus, the seat belt is drawn out until the motor 25 is stopped. That is, the motor 25 is kept energized to rotate the take-up shaft 2 in the belt feeding direction until the desired slack-provided belt length LO is established (a flow along steps $S_{18}$, $S_{19}$ and $S_{23}$).

In step 21, the following operation is carried out in the belt retractor. Upon energizing, the electric motor 25 rotates in the reversed direction causing the second gear 26 to rotate counterclockwise as viewed in FIG. 7. This rotation of the second gear 26 causes the planetary gear 14 to rotate counterclockwise about the pin 10 and to orbit counterclockwise about the sun gear 13. Although the planetary gear 14 can orbit counterclockwise, an angle through which gear 14 can orbit in this direction is limited by the presence of the spring 9 disposed between the first gear 8 and the carrier wheel 10 (see FIG. 1). Thus, after the planetary gear 14 moves along the orbit through the limited angle in the counterclockwise direction, the planetary gear 14 is prevented from orbiting further in the same direction. As a result, the counterclockwise rotation of the planetary gear 14 causes the sun gear 13 and thus the belt take-up shaft 2 to rotate in the clockwise direction, that is, in the belt retracting direction. The electric motor 25 is kept energized to rotate the take-up shaft 2 in the belt retracting direction until the desired slack-provided belt length LO is established (a flow along the steps $S_{21}$, $S_{22}$ and $S_{23}$).

Referring back to the flowchart of FIG. 4B, after the stop of the electric motor 25 (step $S_{23}$), the program returns to step $S_{13}$ and comes to the step $S_{50}$ through steps $S_{14}$ and $S_{15}$. If deceleration of the vehicle takes place before the vehicle speed reaches the predetermined value (60 km/h), the program proceeds from step $S_{50}$ to the step $S_{16}$ to carry out the above-described operation followed in step 16. If the vehicle moves increasing the speed, the answer to the question in step $S_{50}$ is YES, so that the program proceeds to step $S_{51}$ where a determination is made whether the vehicle speed is at the predetermined value or not.

If, based on the output from the judging means 30b, a determination is so made that the vehicle speed is at the predetermined value i.e., 60 km/h, the answer to the question in the step $S_{51}$ is YES and thus the program proceeds to a step $S_{52}$ where the solenoid 20 is deenergized. This step $S_{52}$ is provided for rechecking the reference belt length M on the recognition that by the time the vehicle speed reaches the predetermined value (i.e., 60 km/h), the posture of the seat occupant will be yet made stable than the assumed within the predetermined time period TO (i.e., 10 seconds). Thus, at step $S_{52}$, a "solenoid OFF signal" is issued from the second output means 30c to deenergize the solenoid 20. With this, the belt take-up shaft 2 can rotate under the action of the return spring 4 in the belt retracting direction so as to retract the belt 5, thus removing slack if any, as has been explained in the description of operation (2). After a predetermined period of time T1 set by the timer in a step $S_{53}$, that is, after the slackless but tensioned fitting of the seat belt 5 to the seat occupant is accomplished, the program proceeds from step $S_{53}$ to a step $S_{54}$ where, based on the output from the second output means 30c, the solenoid 20 is energized. Due to the deenergizing and subsequent energizing of the solenoid 20, as has been described hereinabove, the belt retracting rotation of the belt take-up shaft 2 is suppressed thereby establishing the tensionless and slackness state of the seat belt 5. After execution of step $S_{54}$, the program proceeds to a step $S_{55}$ where, based on the output from the restricting means 30d, a determination is made whether or not a difference (L−LO) between the actually drawn belt length L and the desired slack-provided belt lenth LO is within a range from zero to the predetermined value LL. As is seen from the graph of FIG. 9, the appropriate slack δ is set equal to the value LL when the vehicle speed is less than the predetermined value, and δ is set equal to zero when the vehicle speed is at or greater than the predetermined values. Thus, because the desired slack-provided belt length LO is equal to the reference length M plus the slack δ, at speeds equal to or greater than the predetermined value, LO becomes equal to the reference belt length M along according to step $S_{15}$. That is, at a speed equal to or beyond the predetermined value, the state where L−LO=0 describe a condition wherein the seat belt 5 has assumed an actual length equal to the reference length M (reference belt position) stored in afore-mentioned step $S_{11}$. If the answer to the question in step $S_{55}$ is YES, that is, if the difference (L−LO) is within the above-mentioned range, the program returns to step 13 without changing the reference belt length M which has been stored in step $S_{11}$. Thereafter, the flow along steps $S_{50}$, $S_{51}$ and $S_{59}$ is repeated so long as the vehicle is accelerating at a speed above the predetermined value. Thus, under this condition, the slackless and tensionless fitting of the seat belt 5 to the seat occupant is accomplished without changing the reference belt length M.

If an equality (LL≧L−LO>0) is employed as a substitute for the above-described inequality (LL≧L−LO≧0), the following drawback will be encountered. That is, when the tensionless and slackless state of the seat belt 5 is achieved without changing the reference belt length M (reference belt position) wherein the vehicle is accelerating at a speed above the predetermined value, even a slight movement of the belt wearer due to, for example, increased vehicle speed will force the electric motor 25 to operate to return the seat belt 5 to the reference position M regardless of the slackless and tensionless fitting of the seat belt to the seat occupant. This will cause an overload of the motor, and in the worst case, break the same.

When the seat occupant wearing the seat belt in the slackless and tensionless state moves to the reference position determined by the reference belt length M, there is inevitably produced a clearance between the seat occupant and the seat belt 5. However, since the degree of the clearance is less than the appropriate slack δ (=LL) determined when the vehicle speed is less than the predetermined value, the normal function of the belt retractor is not affected.

If the answer to the question in the step $S_{55}$ is NO, the program proceeds to a step $S_{56}$ where a determination is made as to whether the difference (L−LO) is greater than the predetermined value LL or not. If the answer is YES, the program proceeds to a step $S_{57}$ where the solenoid 20 is deenergized. This is because if the reference belt length M is changed due to considerable movement of the seat occupant (or belt wearer), it becomes impossible to establish appropriate control with the newly set reference belt length M. In order to avoid this, the reference belt length M which has been stored at the initial stage of operation of the retractor remains unchanged. In this condition, as is seen from FIG. 6, the belt take-up shaft 2 is rotated under action of the return spring 4 in the belt retracting direction, i.e., clockwise, so that the seat belt 5 is fitted to the seat occupant with a certain tension applied to the occupant. Then, the program returns from the step $S_{57}$ to the step $S_{13}$ for carrying out the subsequent steps as mentioned hereinabove.

When, thereafer, the vehicle is accelerating at a speed above the predetermined value, the determination at step $S_{59}$ does not provide the belt with slack thereby preventing overload of the motor 25. When the vehicle is decelerated, the posture of the seat occupant returns to the reference position M determined by the reference belt length M so that a subsequent operation is not affected and the program proceeds through step $S_{16}$ to step $S_{60}$ where the solenoid 20 is energized, causing the tensionless and slackless state of the seat belt 5.

If the answer to the question in step $S_{56}$ is NO, that is, if the difference (L−LO) is less than zero (i.e., if the seat belt 5 is retracted by a degree exceeding the reference belt length M), the program proceeds to step $S_{58}$ where the actually drawn belt lenth L is stored as M and then the program returns to the step $S_{13}$. Thereafter, the subsequent operations are carried out using the newly set reference belt length M.

Figure 8:
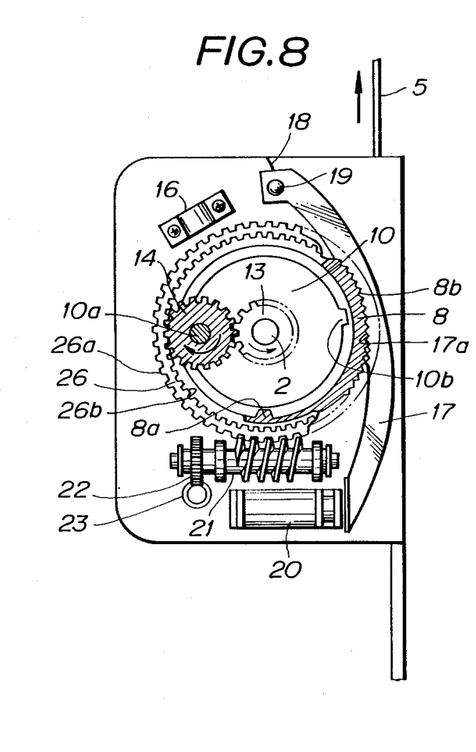

(4) When the seat occupant changes his or her posture in order to, for example, take out an article from a glove box, the seat belt retractor feeds the seat belt 5 in a manner which will be described next with reference to FIG. 8.

Since the planetary gear 14 is allowed to orbit against the spring 9 counterclockwise through the limited angle, the take-up shaft 2 together with the sun gear 13 can rotate counterclockwise although the second gear 26 is fixed and engaged with the worm 21, thus allowing the seat belt 5 to be pulled out of the seat belt retractor so as to follow the change in posture of the seat occupant. Thus, the counterclockwise rotation of the sun gear 13 causes the planetary gear 14 to rotate clockwise, rotating the carrier wheel 10 counterclockwise against the action of the spring 9. The angle of the counterclockwise rotation of the carrier wheel 10 in this circumstance is limited by the spring 9. However, the sun gear 13 can make R turns as the carrier wheel 10 makes a single turn. R can be expressed as:

$R = 1 +$ (the number of teeth 26b of the second gear 26)/(the number of teeth of the sun gear 13).

Thus, suitably selecting the number of teeth, the maximum feeding length of the seat belt 5 upon following the change in posture of the seat occupant can be set to a practical feasible value. When the seat occupant resumes his or her original posture, the take-up shaft 2 and the sun gear 13 rotate clockwise as viewed in FIG. 8 owing to the action of the return spring 4, causing the planetary gear 14 to orbit clockwise while rotating counterclockwise until the carrier wheel 10 assumes the position where the projection 10b engages the projection 8a of the first gear 8. The tensionless state is established when the seat occupant assumes his or her original posture.

(5) The tensionless state is ceased and the seat belt 5 fits firmly around the seat occupant when the vehicle decelerates rapidly or makes a sharp turn or passes through rough terrain:

Referring again to FIG. 3A, the low G sensor 35 generates a signal when the vehicle encounters one of the above-mentioned conditions. Upon receiving this signal, the control unit 30 cuts off the current applied to the solenoid 20, thereby deenergizing the same. When the solenoid 20 is deenergized, the stopper lever 17 is disengaged from the first gear 8 due to the action of the spring 18. This allows the carrier wheel 10 to rotate further in the same direction as the belt retracting direction of the take-up shaft 2. Since, now, the planetary gear 14 can rotate, the take-up shaft 2 is rotated in the belt retracting direction by the return spring 4, applying a tension on the seat belt 5, thus ceasing the tenionless state.

(6) When the tongue is disengaged from the buckle, the belt 5 is retracted by the retractor:

When the seat occupant disengages the tongue from the buckle in order to get off the vehicle, the buckle switch 32 is turned OFF. In this case, the answer to the question in the step S3 is NO, so that the program proceeds to the step S40 where the solenoid 20 is deenergized. The deenergizing of the solenoid 20 establishes a state wherein the take-up shaft 2 is allowed to rotate in the belt retracting direction under the action of the return spring 4. As a result, the take-up shaft 2 can rotate in the belt retracting direction until the seat belt 5 is fully stored into the housing 1 of the seat belt retractor.

According to the seat belt retractor as described hereinabove, a comparison is made between the actually drawn belt length L and the desired slack-provided belt lenth LO at the time when the vehicle speed is at or above a predetermined value (viz., 60 km/h) to detect a difference therebetween, and if the difference is within a predetermined range, the output of the first output means is suppressed. Thus, even when the posture of the seat occupant changes but slightly, the slackless and tensionless state of the seat belt is kept without changing the reference belt length M. Thus, meaningless operation of the motor 25 can be avoided thereby preventing overload of the motor.

According to the seat belt retractor as described hereinabove, an appropriate slack is always provided depending upon running state of the vehicle, i.e., a vehicle speed for example, thereby to secure the safety of the seat occupant. Even in the tensionless state, the belt retractor can feed the belt so as to follow the change in posture of the seat occupant. Thus, the seat occupant can easily change his or her posture and thus becomes free from feeling restrained by the seat belt.

According to the seat belt retractor as described hereinabove, the retraction of the belt is effected by the return spring 4, so that if the control unit 30 fails to operate properly, the seat belt retractor could retract the seat belt under the action of the return spring 4 until the seatl belt 5 fits around the seat occupant firmly, thus serving as an ELR (Emergency Locking Retractor).

What is claimed is:

1. A seat belt retractor for a vehicle comprising:
   a housing;
   a take-up shaft rotatably mounted to said housing;
   biasing means for biasing said take-up shaft in a belt retracting direction to retract a seat belt;
   a gear mechanism operatively connected to said belt take-up shaft;
   a tensionless mechanism operatively connected to said gear mechanism and selectively operable to prevent said biasing means from rotating said take-up shaft in the belt retracting direction;
   a motor actuated slack control mechanism operatively connected to said gear mechanism and selectively operable, independently of said biasing means, to rotate said belt take-up shaft to provide the belt with a predetermined slack by retracting or feeding the same;
   first means for controlling operation of said tensionless mechanism and said motor actuated slack control mechanism in a first given manner;
   second means for controlling operation of said tensionless mechanism and said motor actuated slack control mechanism in a second given manner; and
   third means for selectively operating said first and second means in response to instruction signals.

2. A seat belt retractor as claimed in claim 1, in which said third means comprises a sensor which senses a predetermined speed of a vehicle to which said retractor is practically mounted.

3. In a motor vehicle having a seat,
   a seat belt retractor including a housing, a take-up shaft rotatably mounted to said housing, biasing means for biasing said take-up shaft in a belt retracting direction to retract a seat belt, a gear mechanism operatively connected to said belt take-up shaft, a tensionless mechanism operatively connected to said gear mechanism and operable to prevent said take-up shaft from rotating in said belt retracting direction, and a motor actuated slack control mechanism operatively connected to said gear mechanism and operable to rotate said belt take-up shaft;
   a vehicle speed sensing means outputting a signal representative of a speed of the motor vehicle;
   first means for controlling, based on the speed representing signal, said tensionless mechanism and motor actuated slack control mechanism so as to provide the seat belt in a reference position with a desirable slack in accordance with the vehicle speed;

judging means for making, based on the speed representing signal, a determination as to whether the vehicle speed is at a predetermined value or not;

second means for controlling, based on the speed representing signal, said tensionless mechanism so as to cause the seat belt to assume its tensionless and slackless state; and restricting means which compares the tensionless and slackless position of the seat belt with said reference position of the same to detect a difference therebetween, and suppresses the operation of said first means when the difference is within a predetermined range.

4. A seat belt retractor as claimed in claim 3, in which said first means, said judging means, said second means and said restricting means are arranged in a microcomputer.

5. A seat belt retractor as claimed in claim 1 including a control unit comprising a microcomputer storing a control program therein and wherein said first means comprises said control unit operating under control of slack providing program sections and operating said motor actuating slack control mechanism and said tensionless mechanism in said first manner providing the belt with the predetermined slack.

6. A seat belt retractor as claimed in claim 5 wherein said second means comprises said control unit operating under control of tension and slack removal program sections and operating said motor actuated slack control mechanism and said tensionless mechanism in said second manner to remove tension imposed on the belt by said biasing means in biasing said take-up shaft in the belt retracting direction, to remove slack from the belt.

7. A seat belt retractor as claimed in claim 6 wherein said second means, under control of both tension removal and slack removal program steps, operates in said second manner to establish a tensionless and slackless belt state having a belt length where, by deenergizing said tensionless mechanism to allow said biasing means including a spring means to bias said take-up shaft in the belt retracting direction, slack is eliminated and where, by subsequently energizing said tensionless mechanism to prevent said spring means from biasing said take-up shaft in the belt retracting direction, tension is eliminated.

8. A seat belt retractor as claimed in claim 7 wherein said second means, under control of slack removal program steps, operates in said second manner at selected times to establish a reference belt length where, by deenergizing said tensionless mechanism to allow said spring means to bias said take-up shaft in the belt retracting direction, slack is eliminated, the reference belt length representing a state of minimum length which the belt has assumed.

9. A seat belt retractor as claimed in claim 8 wherein said third means for selectively operating said first and second means includes:

a vehicle speed sensing means outputting a signal representative of speed of the motor vehicle;

calculating means calculating both an appropriate belt slack based on the speed representing signal and a desired slack-provided belt length equal to the appropriate belt slack added to the reference belt length;

judging means for determining whether the vehicle speed is at a predetermined value or not based on the speed representing signal, said third means creating instruction signals based on the speed determination of said judging means for selectively operating said first and second means; and restricting means calculating a difference between a measured actually drawn belt length and the desired slack provided belt length and determining whether the belt length difference is within a predetermined range, said third means creating instruction signals based on the range determination of said restricting means for either suppressing operation of said first means in said first manner if the calculated belt length difference is within the predetermined range, or approriately activating said first means in said first manner if the calculated belt length difference is not within the predetermined range.

10. A seat belt retractor as claimed in claim 9 wherein said restricting means performs the belt length difference calculation when the speed of the motor vehicle is determined by said judging means to be at the predetermined value, the actually drawn belt length equals thed tensionless and slackless belt length and the desired slack provided belt length equals the minimally drawn reference belt length.

11. A seat belt retractor as claimed in claim 10 wherein the predetermined slack provided by operation of said first means in said first manner is equal to the appropriate belt slack calculated by said calculating means.

12. A seat belt retractor as claimed in claim 11 wherein said first means operating in said first manner controls said tensionless mechanism and said motor actuated slack control mechanism in a belt retracting function for providing the belt with the calculated appropriate slack in response to instruction signals created by said third means when said restricting means determines that the calculated belt length difference is less than a lower limit of the predetermined range.

13. A seat belt retractor as claimed in claim 11 wherein said first means operating in said first manner controls said tensionless mechanism and said motor actuated slack control mechanism in a belt feeding function for providing the belt with the calculated appropriate slack in response to instruction signals created by said third means when said restricting means determines that the calculated belt length difference is greater than an upper limit of the predetermined range.

14. A seat belt retractor as claimed in claim 13 in which an angle sensor outputs a signal representative of an angle of rotation of said take-up shaft, said angle sensor providing a means by which belt length is measured.

15. A seat belt retractor as claimed in claim 1 wherein said tensionless mechanism comprises a stopper lever mounted for pivotal motion and having teeth for lockably engaging said gearing mechanism to prevent said spring means from rotating said take-up shaft in the belt retracting direction, the pivotal motion and engagement of said stopper lever with said gearing mechanism being controlled by a selective engagement means comprising a first spring which normally biases said stopper lever away from said gearing means and a solenoid which may be selectively energized to attract a free end of said stopper lever and pivot the same thus overcoming the spring bias and selectively engage said stopper lever with said gearing mechanism for locking the same.

16. A seat belt retractor as claimed in claim 15 wherein said gear mechanism comprises:
- a first gear disposed coaxially with and rotatably about said take-up shaft, said first gear having, for locking engagement with said stopper lever, external teeth which extend radially outward relative to said take-up shaft, said first gear also having a ridge extending axially relative to said shaft in a first direction from the peripheral edges of said gear forming an annular wall section, said annular wall section having a projection extending radially inward;
- a carrier wheel disposed coaxially with and rotatably about said take-up shaft and located axially along said shaft such that it is disposed radially within the perimeter of said annular wall section of said first gear, said carrier wheel having a projection extending radially outward and abutting said inward projection of said first gear, said carrier wheel also having a pintle comprising a pin extending axially in the first direction;
- a limited rotation coupling comprising a second spring fixed to, and axially disposed between to, said first gear and said carrier wheel and resiliently coupling both to limit the relative angle of rotation allowed therebetween and to bias said outward projection of said carrier wheel into engagement with said inward projection of said first gear; and
- a planetary gearing arrangement mounted on said pin of said carrier wheel serving to gear said motor actuated slack control mechanism to said take-up shaft for the controlled rotation of the same and also serving to gear said carrier wheel to said take-up shaft, said planetary gearing arrangement being so geared between said take-up shaft, said carrier wheel, and said motor actuated slot control mechanism such that, when said motor actuated slack control mechanism is deenergized, said carrier wheel and said take-up shaft are directly geared and constrained to a directly geared rotational relationship wherein a rotation of said take-up shaft in a first direction produces a resultant rotation of said carrier wheel in only one possible resultant direction.

17. A seat belt retractor as claimed in claim 16 wherein said planetary gearing arrangement is so geared between said take-up shaft, said carrier wheel, and said motor actuated slack control mechanism such that, when said motor actuated slack control mechanism is deenergized, said carrier wheel and said take-up shaft are directly geared and constrained to a directly geared rotational relationship wherein a rotation of said take-up shaft in a take-up shaft belt retracting direction produces a resultant rotation of said carrier wheel in a carrier wheel belt retracting direction.

18. A seat belt retractor as claimed in claim 17 wherein:
- when said first gear is locked by said tensionless mechanism and
- when said directly geared rotational relationship is established between said carrier wheel and said take-up shaft by deenergizing said motor actuated slack mechanism and
- when said first gear inward projection and said carrier wheel outward projection are biased into engagement by said limited rotation coupling,
- then said first gear inward projection and said carrier wheel outward projection are juxtaposed such that said locked first gear inward projection prevents said outward projection, and thus said carrier wheel, from rotating in the carrier wheel belt retracting direction, said carrier wheel in turn, by virtue of said directly geared relationship, preventing rotation of said take-up shaft in the take-up shaft belt retracting direction.

* * * * *